(12) United States Patent
Okamura

(10) Patent No.: US 10,935,965 B2
(45) Date of Patent: Mar. 2, 2021

(54) OPERATION MANAGEMENT APPARATUS

(71) Applicant: FANUC Corporation, Yamanashi (JP)

(72) Inventor: Yasumasa Okamura, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/292,334

(22) Filed: Mar. 5, 2019

(65) Prior Publication Data

US 2019/0278258 A1 Sep. 12, 2019

(30) Foreign Application Priority Data

Mar. 6, 2018 (JP) .............................. JP2018-039951

(51) Int. Cl.
*G05B 19/418* (2006.01)
*G05B 19/4155* (2006.01)

(52) U.S. Cl.
CPC ... *G05B 19/41865* (2013.01); *G05B 19/4155* (2013.01); *G05B 19/4183* (2013.01); *G05B 2219/31429* (2013.01)

(58) Field of Classification Search
CPC .......... G05B 19/41865; G05B 19/4183; G05B 2219/31429; G05B 2219/32253
See application file for complete search history.

(56) References Cited

U.S. PATENT DOCUMENTS

| | | | |
|---|---|---|---|
| 2005/0228533 A1 | 10/2005 | Hioki et al. | |
| 2010/0305758 A1* | 12/2010 | Nishi | B23Q 17/00 700/264 |
| 2013/0006391 A1* | 1/2013 | Kito | G05B 19/409 700/11 |
| 2014/0172148 A1* | 6/2014 | Miller | G05B 19/409 700/183 |
| 2015/0066434 A1* | 3/2015 | Ogawa | G05B 19/4063 702/187 |
| 2015/0112459 A1* | 4/2015 | Haraguchi | G05B 19/408 700/86 |
| 2015/0278752 A1 | 10/2015 | Ishii et al. | |
| 2016/0327938 A1* | 11/2016 | Kawai | G05B 19/40937 |
| 2019/0137977 A1* | 5/2019 | Sato | G05B 19/4155 |

FOREIGN PATENT DOCUMENTS

| | | |
|---|---|---|
| JP | H9-216146 A | 8/1997 |
| JP | H11345008 A | 12/1999 |
| JP | 2005-301440 A | 10/2005 |
| JP | 2015-75868 A | 4/2015 |
| JP | 2015-191633 A | 11/2015 |

* cited by examiner

*Primary Examiner* — Vincent H Tran
(74) *Attorney, Agent, or Firm* — Hauptman Ham, LLP

(57) ABSTRACT

An operation management apparatus predicts the machining processes of one or more facilities. This operation management apparatus acquires a machining program operating on the facilities and including an execution time for each process, generates schedule data to which related information (an identifier of the process) is added, and generates, for each of the facilities, a graph (a process schedule) including a time axis and indicating a progress of the process, based on the generated schedule data.

11 Claims, 7 Drawing Sheets

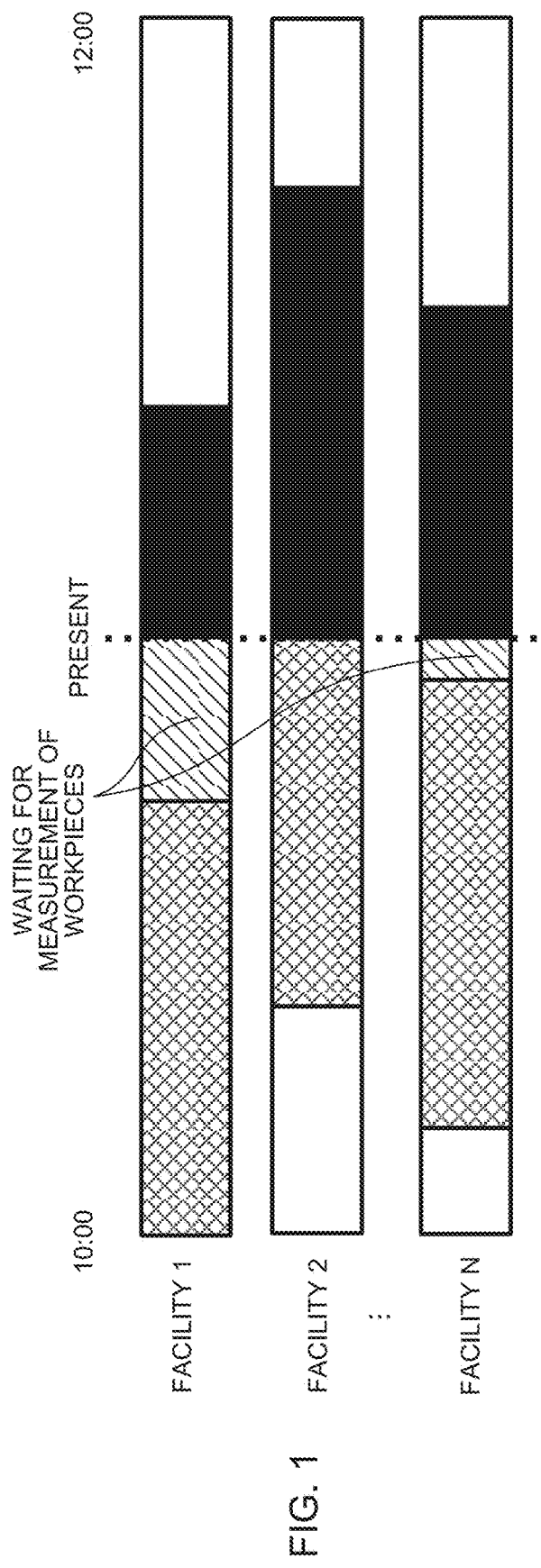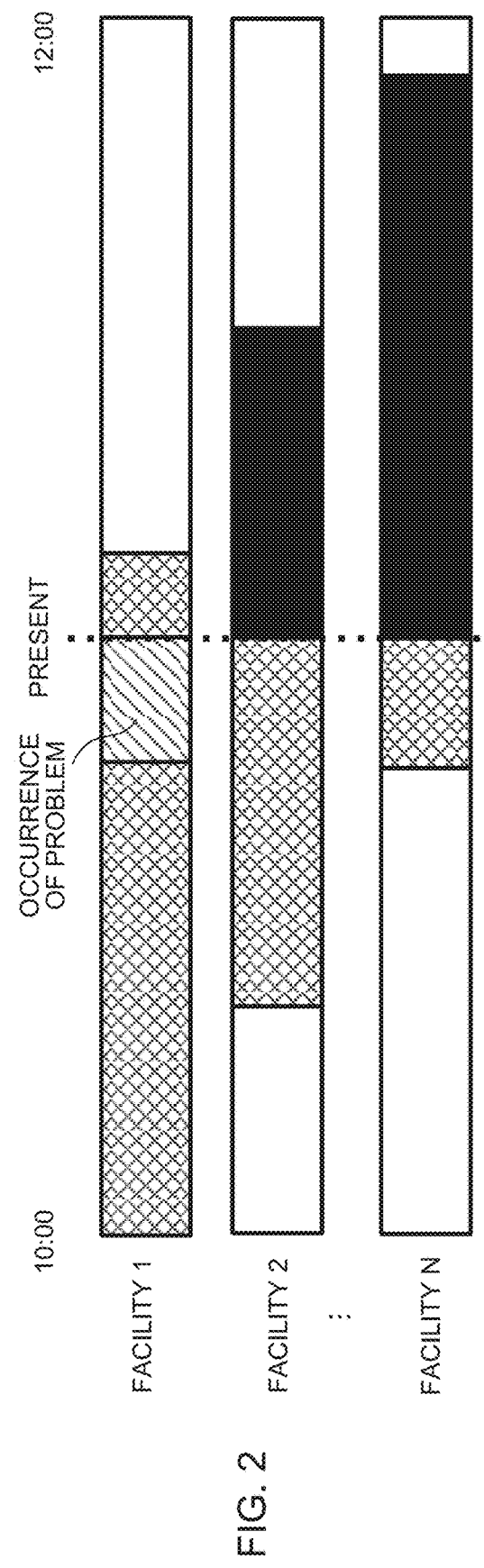

| PROGRAM ID | FACILITY | ... | BLOCK ID | CONTENTS | START TIME |
|---:|---:|---|---|---|---:|
| 0001 | 1 | ... | 1219 | N01 ... | 8:30 |
| 0001 | 1 | ... | 1220 | N02 ... | 8:31 |
| ... | ... | ... | ... | ... | ... |
| 0001 | 1 | ... | xxxx | Nxx ... | 9:29 |

| EVENT | CONTENTS OF EVENT | OCCURRENCE TIME | PROGRAM ID | ... | BLOCK ID | CONTENTS |
|---|---|---|---|---|---|---|
| ALARM | SV0001 | 8:50 | 0001 | ... | 1219 | N01 ... |

| PROGRAM ID | ... | BLOCK ID | CONTENTS |
|---|---|---|---|
| 0001 | ... | 1219 | N01 ... |
| 0001 | ... | 1220 | N02 ... |

OPERATION MANAGEMENT APPARATUS

RELATED APPLICATIONS

The present application claims priority to Japanese Patent Application Number 2018-039951 filed Mar. 6, 2018, the disclosure of which is hereby incorporated by reference herein in its entirety.

BACKGROUND OF THE INVENTION

1. Field of the Invention

The invention relates to an operation management apparatus for predicting machining processes of a plurality of facilities.

2. Description of the Related Art

Computer systems for operation management of production facilities are provided. For example, Japanese Patent Application Laid-Open No. 2015-075868 discloses a system that displays a Gantt chart for managing an operation schedule of production facilities. Japanese Patent Application Laid-Open No. 2015-191633 discloses a system that displays a work object for each of a plurality of production lines in a Gantt chart.

As illustrated in FIG. 1, in a case where a plurality of facilities (machine tools and the like) are operating in parallel, it is extremely difficult for a manager to recognize what facility a process of requiring actual work by a human hand such as waiting for the measurement of workpieces or waiting for the replacement of workpieces occurs in. However, unless the priority is recognized accurately and the actual work is executed efficiently, the operation rate of the whole facilities will be reduced.

Also, as illustrated in FIG. 2, in a case where the same type of a plurality of facilities (machine tools or the like in which the same programs are operating) are operating in parallel, when a problem (for example, an occurrence of an alarm, a signal exceeding a threshold, and the like) occurs in a certain facility, there is a possibility that the same problems arise in chains in other facilities. It is extremely difficult for a manager to predict what facility a problem occurs in. However, unless the priority is recognized accurately and measures are taken efficiently, the operation rate of the whole facilities will be reduced.

SUMMARY OF THE INVENTION

The invention has been made to solve such problems, and an object of the invention is to provide an operation management apparatus for predicting the machining processes of a plurality of facilities.

According to the invention, there is provided an operation management apparatus for predicting machining processes of one or more facilities, including: a data processing unit for acquiring a machining program operating on the facilities and including an execution time for each process, and generating schedule data to which related information is added, the related information being an identifier of the process; and a control unit for generating a process schedule for each of the facilities, the process schedule being a graph including a time axis and indicating a progress of the process based on the schedule data.

The data processing unit may acquire a machining program operating on the facilities, and further generate machining program data to which the related information is added, the related information being an identifier of a process included in the machining program. Also, the control unit may receive a selection of the process of the machining program, specify the related information of the selected process, extract the process having the specified related information from the schedule data, and highlight the extracted process on the process schedule.

The data processing unit may further acquire event information from the facilities, and generate actual measurement event data obtained by adding the related information to the event information when a predetermined event has occurred. Also, the control unit may specify the related information associated with the actual measurement event data, extract the process having the specified related information from the schedule data, and highlight the extracted process on the process schedule.

According to the invention, it is possible to provide an operation management apparatus for predicting the machining processes of a plurality of facilities.

BRIEF DESCRIPTION OF THE DRAWINGS

FIG. 1 is a diagram for describing the problem of the invention;

FIG. 2 is a diagram for describing the problem of the invention;

DETAILED DESCRIPTION OF THE PREFERRED EMBODIMENTS

A configuration of an operation management apparatus 1 according to the embodiment will be described.

Figure 3:
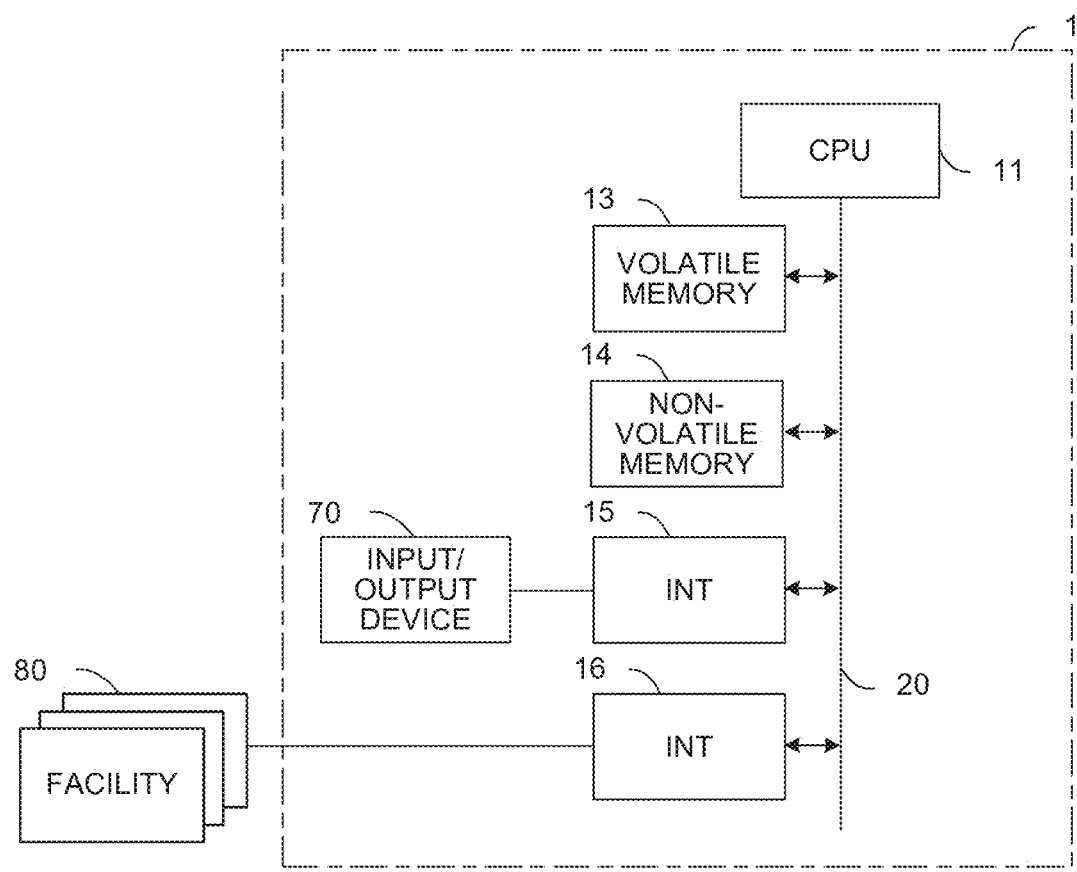
FIG. 3 is a hardware configuration diagram in one embodiment of the operation management apparatus.

FIG. 3 is a schematic hardware configuration diagram of the main part of the operation management apparatus 1 according to the embodiment.

The operation management apparatus 1 is typically an information processing apparatus such as a server computer or a personal computer. A CPU 11 provided in the operation management apparatus 1 is a processor that controls the operation management apparatus 1 as a whole, reads a program stored in a non-volatile memory 14 through a bus 20, and controls the entire operation management apparatus 1 according to the read program.

The non-volatile memory 14 is configured as a memory in which a stored state is maintained even though a power supply of the operation management apparatus 1 is turned off, for example, by being backed up by a battery (not illustrated), and so on. The program and data stored in the non-volatile memory 14 may be developed in the volatile memory 13 at the time of use. In addition to the program and data developed from the non-volatile memory 14, temporary calculation data and display data, data input through an input device, and the like are stored in the volatile memory 13.

An input/output device 70 is, for example, a display, a keyboard, or the like. Commands and data input from the keyboard of the input/output device 70 are delivered to the CPU 11 through an interface 15. Also, the display data output from the CPU 11 is displayed on the display of the input/output device 70 through the interface 15.

A facility 80 is a production facility, typically a machine tool. One or more facilities 80 are connected to the operation management apparatus 1 through a communication interface 16. The data transmitted from the facility 80 is delivered to the CPU 11 through the communication interface 16.

Figure 4:
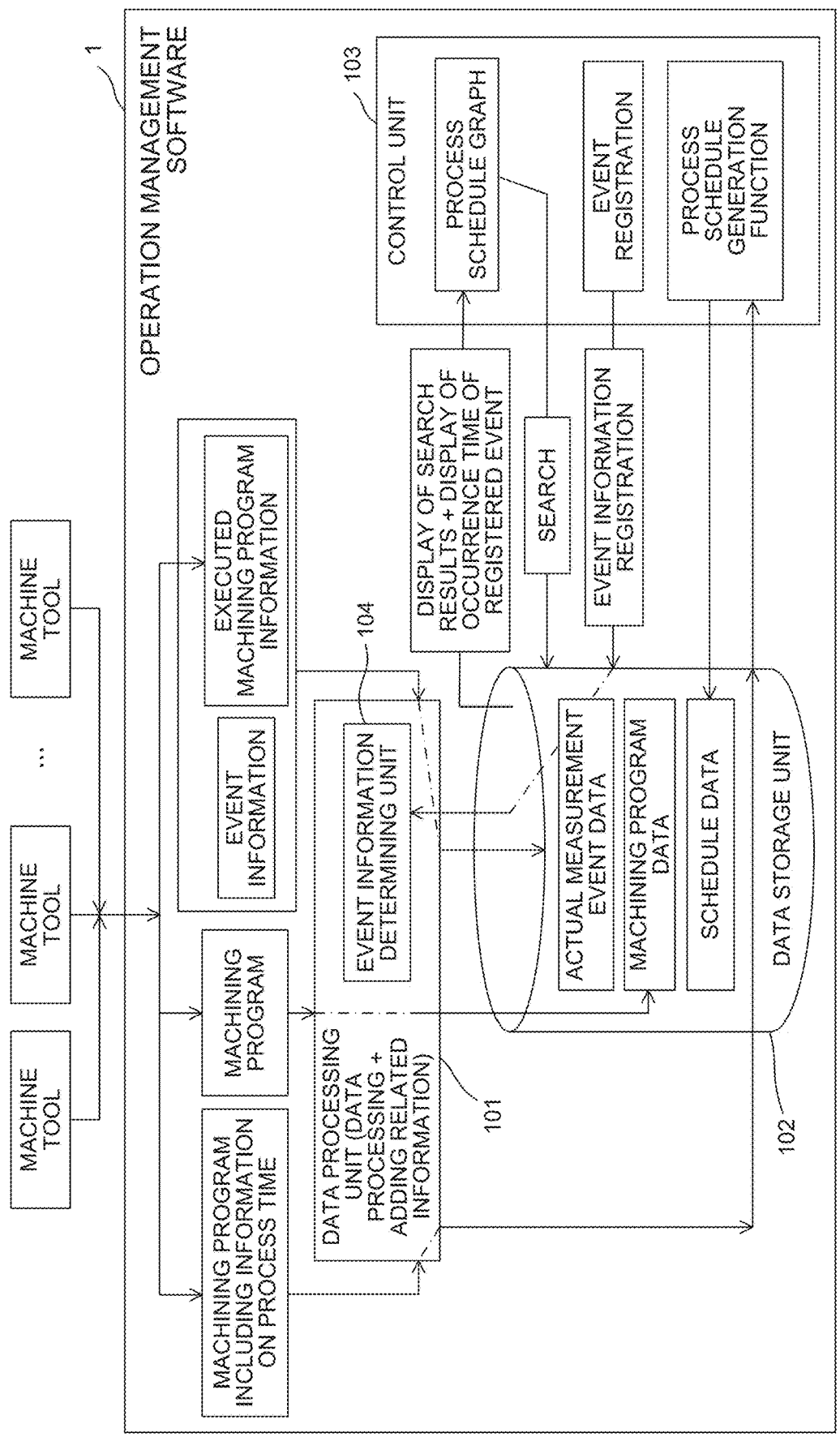
FIG. 4 is a block diagram illustrating a functional configuration of the operation management apparatus of FIG. 3.

FIG. 4 is a block diagram illustrating a schematic functional configuration of the operation management apparatus 1 according to the embodiment.

The operation management apparatus 1 is implemented as a function of the operation management software that operates on a computer. The operation management apparatus 1 includes a data processing unit 101 for acquiring and processing data such as a machining program and event information from a facility such as one or more machine tools and the like, data storage unit 102 for storing the machining program and event information acquired and processed by the data processing unit 101, and a control unit 103 for generating and displaying schedule data using the machining program and event information stored in the data storage unit 102. Also, the data processing unit 101 includes an event information determining unit 104 for determining event information.

Figures 5, 6:
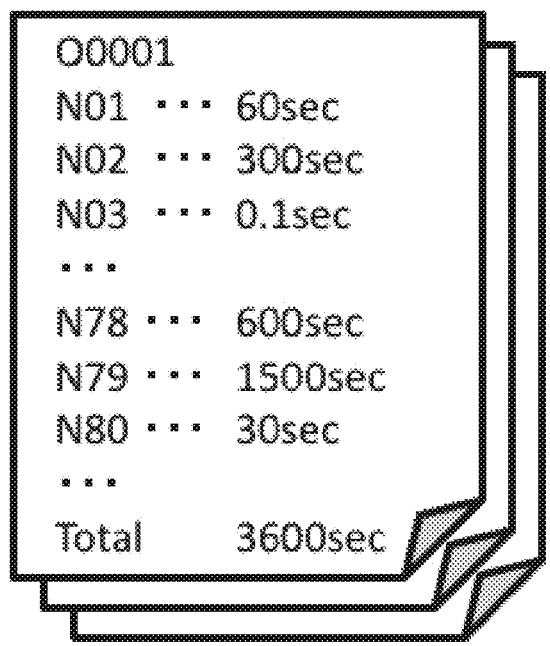
FIG. 5 is a diagram illustrating an example of a machining program including information on process time.
FIG. 6 is a diagram illustrating an example of schedule data.

From a facility such as a machine tool, or from an apparatus including information on a machining program operating on the facilities, the data processing unit 101 acquires a machining program including information on the process time as illustrated in FIG. 5. This machining program is characterized in that the process time for each block (a time required for executing the block) is described in advance. The process time can be obtained by, for example, an actual measurement or machining time prediction.

The data processing unit 101 generates schedule data, as illustrated in FIG. 6, based on the machining program including information on the process time. The schedule data includes a program ID of the machining program, an ID of a facility that is an acquisition source of the machining program, a block ID, contents of the block, a start time of the block, and the like. The start time of the block can be calculated by cumulatively adding the process time for each block of the machining program to the execution start time of the machining program.

Figures 7, 8, 9:
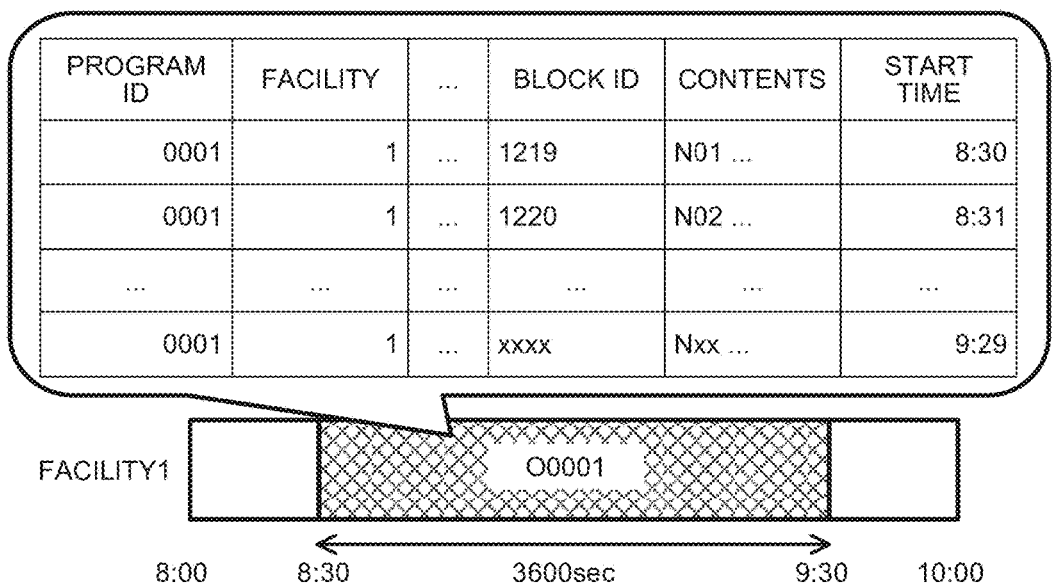
FIG. 7 is a diagram illustrating an example of actual measurement event data.
FIG. 8 is a diagram illustrating an example of machining program data.
FIG. 9 is a diagram illustrating the generation processing of a process schedule.

Also, the data processing unit 101 acquires event information from the facility such as a machine tool. The event information is operation information collected from the facility such as a machine tool, like a signal and an operating state. When a predetermined event (an occurrence of an alarm, exceeding a threshold, or the like) is detected by the event information determining unit 104, the data processing unit 101 generates actual measurement event data, as illustrated in FIG. 7, based on the collected event information. The actual measurement event data includes a type of an event, the contents of the event, and an occurrence time, and an ID of a program, an ID of a block, and the contents of the block being executed when the event has occurred, and the like.

Also, the data processing unit 101 acquires a machining program, from a facility such as a machine tool, or from an apparatus including information on a machining program operating on the facilities. This machining program does not include the process time that is information specific to the facility. That is, this is information regardless of what facility is executed. The data processing unit 101 generates machining program data, as illustrated in FIG. 8, based on the machining program. The machining program data includes a program ID, a block ID, and the contents of the block of the machining program.

The schedule data, the actual measurement event data, and the machining program data are characterized in that they are associated with one another by the block ID in the example as described above. In this way, herein, information associating each data with one another is referred to as the "related information". In the present embodiment, by using the block ID as the related information, the machining program, the event, and the process schedule are associated with one another in units of a process (a block). The data processing unit 101 stores the generated schedule data, the actual measurement event data, and machining program data in the data storage unit 102.

With reference to the schedule data of the data storage unit 102, the control unit 103 generates a process schedule. For example, once schedule data as illustrated in (an upper portion of) FIG. 9 is stored in the data storage unit 102, the control unit 103 generates a Gantt chart indicating the execution time band of the program O001 being executed by the facility 1 to be displayed on the display as illustrated in (a lower portion of) FIG. 9.

Also, the control unit 103 has a function of highlighting a corresponding portion of the process schedule in response to designation of a specific block of the machining program or according to the occurrence of the event by utilizing the related information as described above. These functions will be described in detail as Examples 1 and 2.

EXAMPLE 1

When a certain process (a block) of a machining program is selected by an operator, a process search function of highlighting a corresponding portion on a process schedule will be described with reference to FIG. 10.

Figure 10:
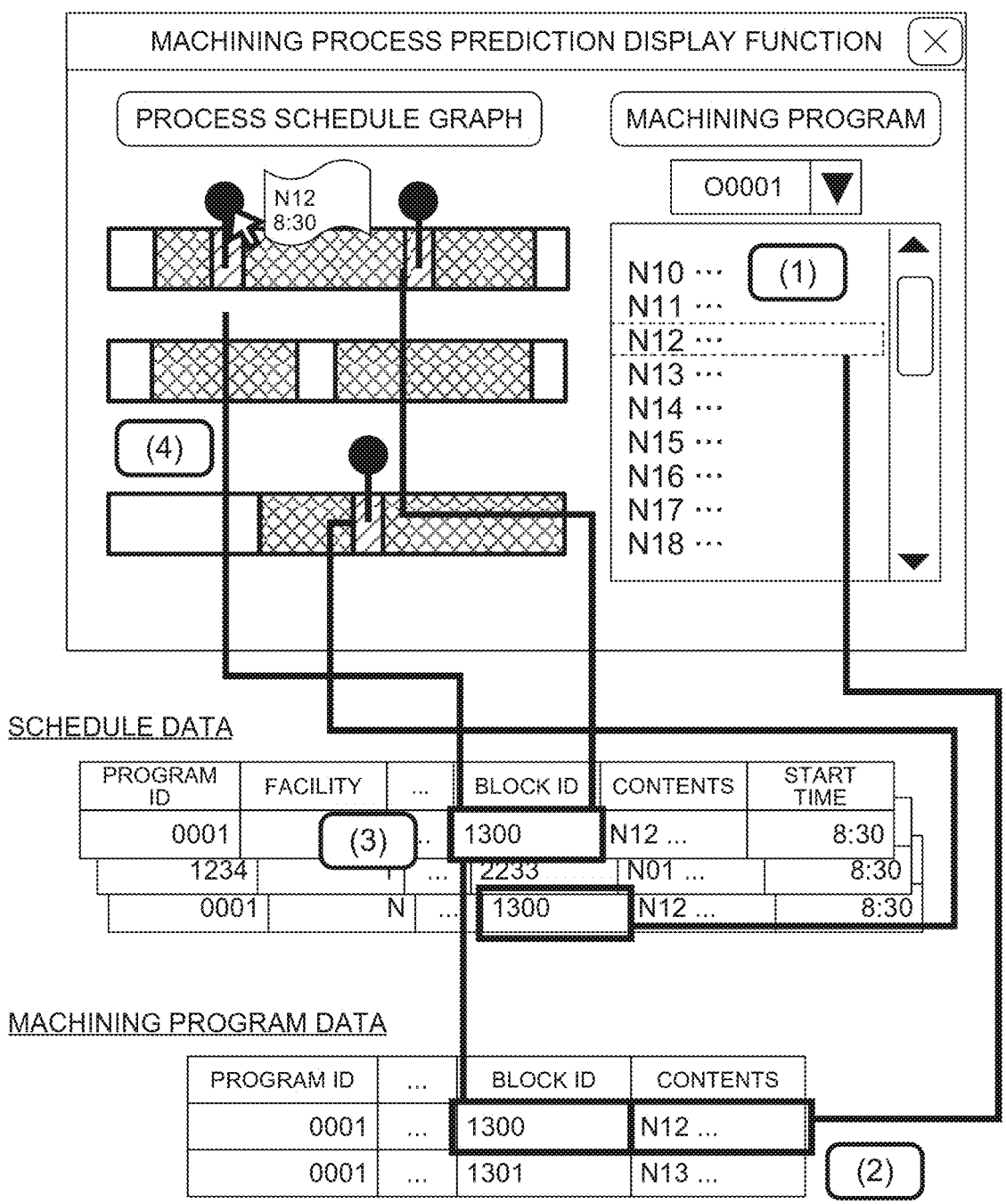
FIG. 10 is a diagram illustrating a process search function.

FIG. 10 illustrates an execution screen of the process search function. On this execution screen, the process schedule (on the left side) generated by the control unit 103 and the machining program (on the right side) are displayed. The machining program displayed here can be optionally designated by a user from a drop-down menu. Once (1) it is detected that a certain process (a block, that is, a row) of the machining program (on the right side) is selected, (2) with reference to the corresponding machining program data, the control unit 103 specifies the ID of the selected block. Subsequently, (3) with reference to the schedule data, one or more records are extracted by using the block ID specified in the (2) as a key. Finally, (4) on the process schedule, for example, pins are displayed at the positions (a facility ID, a start time) corresponding to the records extracted in the (3).

Incidentally, a plurality of rows may be selected in the (1). Also, the display of the pins in the (4) is merely an example, and highlighting display may be performed by any other methods.

According to the example, it is possible for an operator to easily search what facility a certain process is scheduled in to be executed at any given time.

EXAMPLE 2

Figure 11:
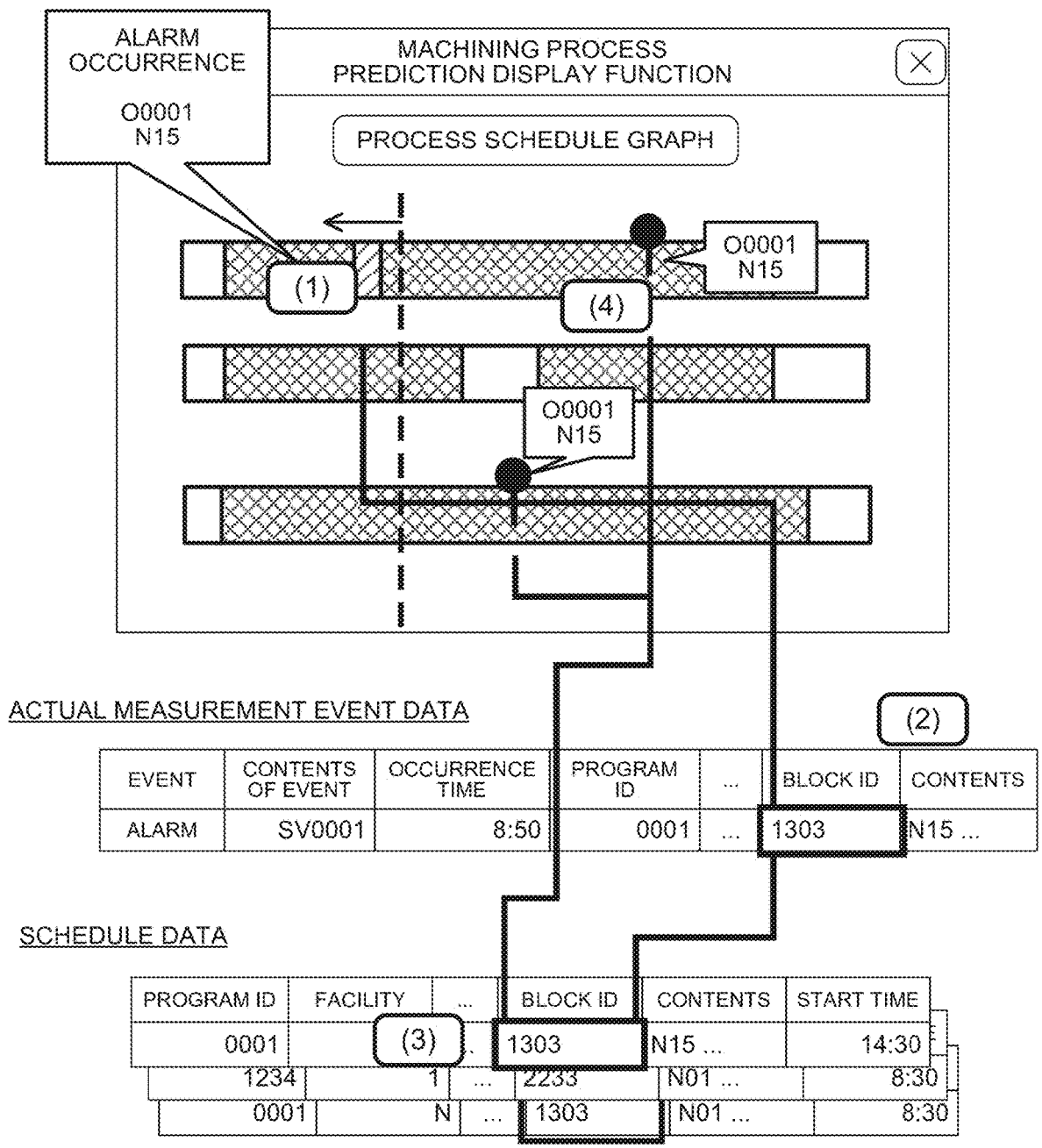
FIG. 11 is a diagram illustrating an event occurrence prediction display function.

With reference to FIG. 11, there will be described an event occurrence prediction display function of highlighting a corresponding portion on a process schedule when a predetermined event (an occurrence of an alarm, a signal exceeding a threshold, and the like) occurs in the facility.

FIG. 11 illustrates an execution screen of the event occurrence prediction display function. On this execution screen, the process schedule generated by the control unit 103 is displayed. Once (1) an occurrence of a predetermined event is detected in the facility, actual measurement event data is generated by the data processing unit 101. For example, the predetermined event is registered by the control unit 103 and set in the event information determining unit 104. The control unit 103, (2) specifies the block ID with reference to the actual measurement event data, and (3) extracts one or more records using the block ID specified in the (2) as a key, with reference to the schedule data. Finally, (4) on the process schedule, for example, pins are displayed at the positions (a facility ID, a start time) corresponding to the records extracted in the (3). Incidentally, the display of the pins is merely an example, and highlighting display may be performed by any other methods.

According to the example, the same processes as the process being executed when the predetermined event has occurred are highlighted. In this way, it is possible to easily search what facility a process that is likely to cause an event such as an alarm or exceeding a threshold is scheduled to be executed in at any given time.

The operation management apparatus 1 according to the embodiment manages a process executed by one or more facilities based on a machining program. The operation management apparatus 1 is capable of generating a process schedule based on the process time required for executing each process of the machining program. Also, it is possible to closely and operatively connect the machining program with the process schedule, or a dynamically generated event with the process schedule, respectively.

Incidentally, the embodiment is not limited to the above-described embodiment, but can be implemented in various forms by making appropriate changes. For example, in the embodiment as described above, the block ID is used as the related information, but a combination of, for example, a program ID and a row number can be substituted for the block ID.

The invention claimed is:

1. An operation management apparatus for predicting machining processes of one or more facilities, comprising:
   a data processing unit for acquiring a machining program operating on the facilities and including an execution time for each process, and generating schedule data to which related information is added, the related information being an identifier of the process; and
   a control unit for generating a process schedule for each of the facilities, the process schedule being a graph including a time axis and indicating a progress of the process based on the schedule data,
   wherein the data processing unit further acquires event information from the facilities, and generates actual measurement event data obtained by adding the related information to the event information when a predetermined event has occurred, and
   the control unit specifies the related information associated with the actual measurement event data, extracts the process having the specified related information from the schedule data, and highlights the extracted process on the process schedule.

2. The operation management apparatus according to claim 1,
   wherein the data processing unit acquires a machining program operating on the facilities and further generates machining program data to which the related information is added, the related information being an identifier of a process included in the machining program, and
   the control unit receives a selection of the process of the machining program, specifies the related information of the selected process, extracts the process having the specified related information from the schedule data, and highlights the extracted process on the process schedule.

3. The operation management apparatus according to claim 1,
   wherein the schedule data includes
      a program ID of the machining program,
      an ID of a facility executing the machining program,
      contents of the process, and
      a start time of the process.

4. The operation management apparatus according to claim 1,
   wherein the control unit is configured to generate the process schedule based on the execution time required for executing each process of the machining program.

5. The operation management apparatus according to claim 1,
   wherein the execution time includes a predicted machining time.

6. The operation management apparatus according to claim 1,
   wherein the related information includes a combination of
      a program ID of the machining program with
      the identifier of the process in the program.

7. An operation management apparatus for predicting machining processes of facilities, the operation management apparatus comprising a processor configured to
   acquire a machining program operating on the facilities and including an execution time required for executing each process of the machining program,
   generate schedule data to which related information is added, the related information being an identifier of the process,
   generate a process schedule for each of the facilities, the process schedule being a graph including a time axis and indicating a progress of the process based on the schedule data,
   acquire event information from the facilities,
   generate actual measurement event data obtained by adding the related information to the event information in response to an occurrence of a predetermined event,
   specify the related information associated with the actual measurement event data,
   extract the process having the specified related information from the schedule data, and
   highlight the extracted process on the process schedule.

8. The operation management apparatus according to claim 7, wherein the processor is further configured to
   generate machining program data to which the related information is added,
   receive a selection of the process of the machining program,
   specify the related information of the selected process, extract the process having the specified related information from the schedule data, and highlight the extracted process on the process schedule.

9. The operation management apparatus according to claim 7,
wherein the schedule data includes
a program ID of the machining program,
an ID of a facility executing the machining program,
contents of the process, and
a start time of the process.

10. The operation management apparatus according to claim 7, wherein the execution time includes a predicted machining time.

11. The operation management apparatus according to claim 7,
wherein the related information includes a combination of
a program ID of the machining program with
the identifier of the process in the program.

* * * * *